United States Patent [19]

Glaeser

[11] 4,017,304

[45] Apr. 12, 1977

[54] PROCESS FOR SELECTIVELY CHLORINATING THE TITANIUM CONTENT OF TITANIFEROUS MATERIALS

[75] Inventor: Hans Hellmut Glaeser, Wilmington, Del.

[73] Assignee: E. I. Du Pont de Nemours and Company, Wilmington, Del.

[22] Filed: Sept. 18, 1973

[21] Appl. No.: 398,470

Related U.S. Application Data

[63] Continuation-in-part of Ser. No. 299,470, Oct. 20, 1972, abandoned.

[52] U.S. Cl. .................................. 75/33; 423/76; 423/79; 423/415 R; 423/492
[51] Int. Cl.$^2$ .................. C22B 5/10; C01G 23/02; C01B 31/18; C21B 15/00
[58] Field of Search .......... 423/76, 79, 492, 415 A, 423/415; 75/33

[56] References Cited

UNITED STATES PATENTS

| | | | |
|---|---|---|---|
| 2,589,466 | 3/1952 | Wilcox | 423/79 X |
| 2,802,721 | 8/1957 | Cooper | 423/79 |
| 2,970,887 | 2/1961 | Hill | 423/492 |
| 3,359,065 | 12/1967 | Zirngibl et al. | 423/492 |
| 3,495,936 | 2/1970 | Jones, Jr. | 423/492 X |
| 3,859,077 | 1/1975 | Othmer | 423/149 X |

OTHER PUBLICATIONS

J. Barksdale's book "Titanium", 1966, Second Edition, p. 417, The Ronald Press Co., New York.

*Primary Examiner*—Edward Stern

[57] ABSTRACT

A reduction/chlorination process is provided for the treatment of titaniferous materials such as ilmenite ores. The chlorination is selective in that the titanium constituent of the titaniferous material is chlorinated, but there is no appreciable net yield of iron chloride from the iron constituent. Where other metals such as vanadium are present they may be chlorinated with the titanium. The reduction utilizes as the reductant an amount of carbonaceous material which, based on oxygen in the titaniferous material, is at least stoichiometric to produce carbon monoxide. The selective chlorination utilizes as the chlorinating agent either ferrous chloride ($FeCl_2$) alone or certain combinations of ferrous chloride and one or more other chlorine-containing members, notably molecular chlorine ($Cl_2$) and hydrogen chloride (HCl). The use of ferric chloride ($FeCl_3$) as a part or all of the chlorinating agent is the equivalent of using a $FeCl_2/0.5\ Cl_2$ mixture. Preferably, sufficient chlorine atoms are provided by the chlorinating agent to react with essentially all of the titanium in the titaniferous material. An elevated temperature in the range of 950° to 1400° C. is maintained during the chlorination, but depending upon the composition of the chlorinating agent, there may be a minimum temperature in the range which is needed to maintain selectivity.

13 Claims, 11 Drawing Figures

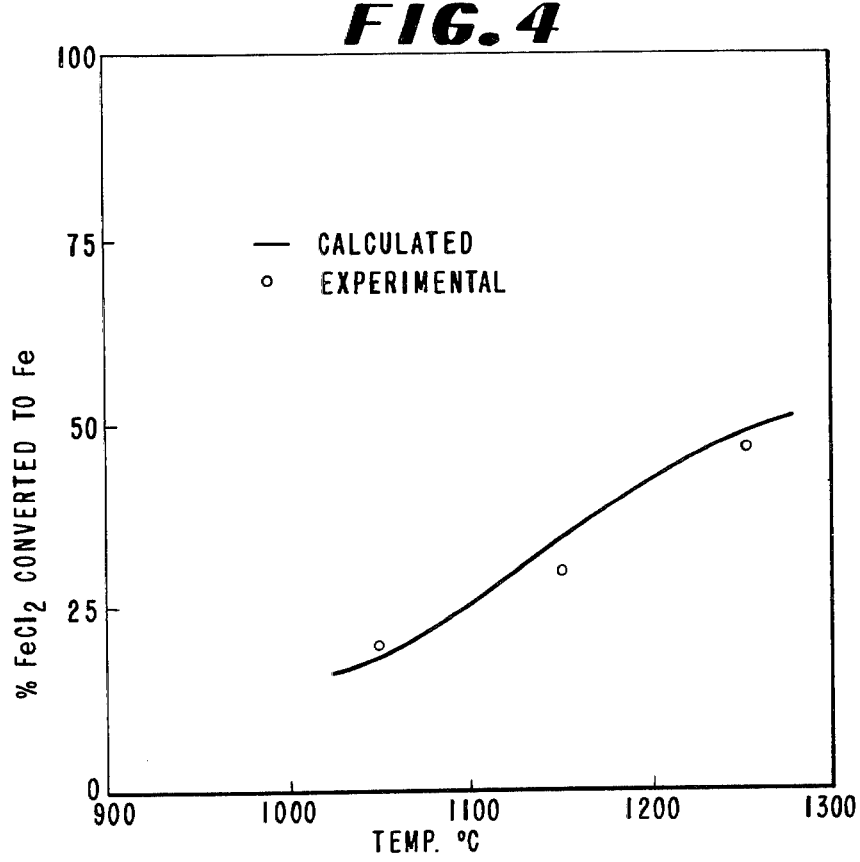
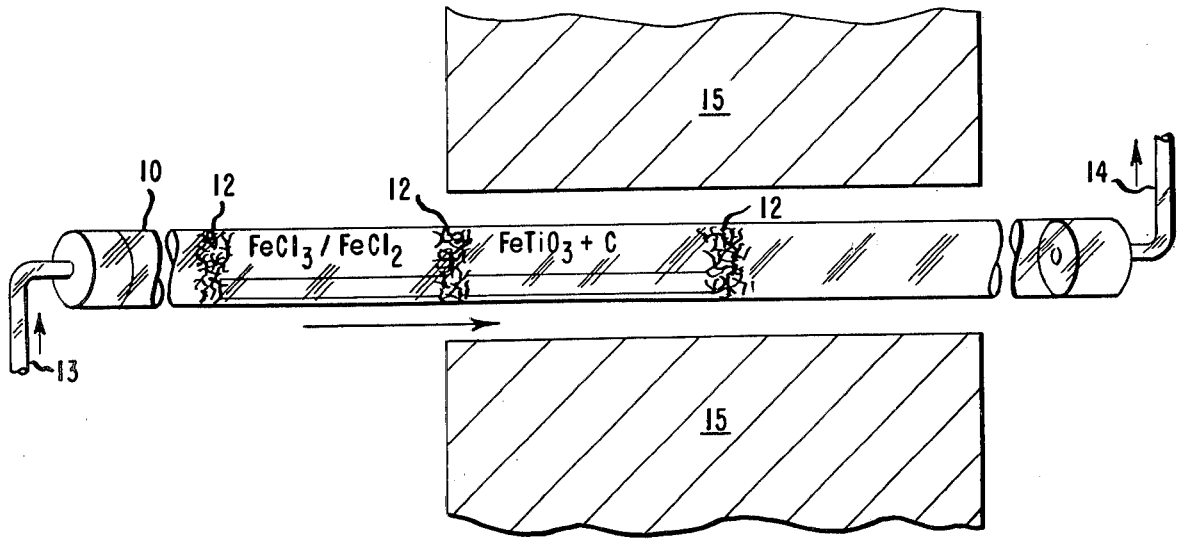

$FeTiO_3 + 3C + yCL_2 + 2FeCL_2$ y = 1.76
y = 1.84
y = 1.92

$FeTiO_3 + 3C + 2FeCL_2 + yFeCL_3$ y = 1.21
y = 1.29

PROCESS FOR SELECTIVELY CHLORINATING THE TITANIUM CONTENT OF TITANIFEROUS MATERIALS

CROSS-REFERENCE TO RELATED APPLICATION

This application is a continuation-in-part of copending application Ser. No. 299,470 filed Oct. 20, 1972, now abandoned.

BACKGROUND OF THE INVENTION

For many years, a great deal of attention has been devoted to techniques aimed at the effective separation of the titanium and iron constituents of titaniferous ores such as ilmenite. Nonselective cholorination techniques, i.e., in which the two metals are chlorinated simultaneously and the chlorides then separated from one another, have proven to be sufficiently effective that they are now practiced in the manufacture of titanium dioxide ($TiO_2$) pigments, particularly by the so-called "chloride" process involving the oxidation of titanium tetrachloride ($TiCl_4$). Such techinques are much less efficient than would be desired, however, since depending upon the iron content of the ore a considerable amount of costly chlorinating agent may be consumed in producing relatively useless iron chlorides as by-products. Conversion of the latter to metallic iron or some form of iron oxide would be desirable to recover the chlorine content and to eliminate the waste disposal problem which has been associated with iron chlorides, but such conversion is difficult to achieve in economic fashion.

Other techniques for separating the iron and titanium constituents of ores have been devised that involve selectively chlorinating the iron content, thereby leaving an upgraded or beneficiated $TiO_2$ fraction. While these have also achieved some measure of commercial importance, they have not served to lessen the problems associated with the formation of iron chloride by-products. Then, too, if one considers that $TiCl_4$ is the desired intermediate, i.e., for producing a $TiO_2$ pigment or matallic titanium, such beneficiation merely introduces an added step because the beneficiated fraction must still be chlorinated.

One approach that might appear to overcome the shortcomings of the above-noted techniques is that described in Wilcox U.S. Pat. No. 2,589,466. According thereto an ore such as ilmenite is said to be treated by chlorine in such a way that $TiCl_4$ is produced without chlorination of iron. In repeated endeavors to follow the procedure of that patent as closely as possible, it has been found that a selective chlorination of the titanium does not occur; that is, that instead of selective chlorination the chlorine attacks iron either preferentially over titanium, or at least nearly equally, at temperatures up to essentially 1400° C. That the process of the Wilcox patent would not result in a successful selection chlorination of the titanium constituent in ilmenite had been predicted on the basis of calculated equilibrium constants by S. Wilska, *Suomen Kemistilehti*, 29A, pages 220 to 225, 1956; *Chemical Abstracts* (1957), 4801(f). In C. C. Patel et al., *Transactions of the Metallurgical Society of AIME*, 218, pages 219–225 (April, 1960) it is further stated in reference to the Wilcox patent that "no justification can be found for the preferential chlorinaton at 1250° to 1500° C. of titania of roasted ilmenite..."

In the specification set forth hereinafter I describe my findings of a unique process for chlorinating the more useful titanium constituent of a titaniferous ore in a way that leaves the less useful iron constituent unchlorinated and, preferably, in the metallic state. That the titanium could be chlorinated without chlorinating the iron is contrary to what would have been expected from various technical articles, including those aforementioned as well as, more recently, S. H. Iqbal et al., *Chemical Engineering World*, Vol. VI, No. 8, pages 81–83 (1971). That such titanium chlorination could, moreover, be accomplished economically and efficiently using readily available starting materials is all the more unexpected.

SUMMARY OF THE INVENTION

In accordance with my invention, there is provided a reduction/chlorination process for the treatment of titaniferous materials in such a way that the titanium constituent is chlorinated but there is no appreciable net yield of iron chloride from the iron constituent. The reduction utilizes as the reductant an amount of carbonaceous material which, based on oxygen in the titaniferous material, is at least stoichiometric to produce carbon monoxide. The selective chlorination utilizes as the chlorinating agent either ferrous chloride alone or a combination of ferrous chloride ($FeCl_2$) plus molecular chlorine ($Cl_2$) and/or hydrogen chloride (HCl). The use of ferric chloride ($FeCl_3$) as a part or all of the chlorinating agent is the equivalent of using a $FeCl_2/0.5\ Cl_2$ mixture. Sufficient chlorine atoms are preferably provided by the chlorinating agent to react with essentially all of the titanium in the titaniferous material. As will be apparent from the detailed description of the invention below, the amount of $Cl_2$ and/or HCl present in the chlorination will be maintained at a sufficiently low level that there is no net yield of iron chloride, i.e., advantageously no more than about 4 atoms of chlorine being provided by $Cl_2$ and/or HCl for each mole of $FeCl_2$ which is present. An elevated temperature in the range of 950° to 1400° C. is maintained during the chlorination. Depending upon the composition of the chlorinating agent, there may be a minimum temperature within the stated range that is meeded to maintain selectivity.

It is a significant feature of this invention that ferrous chloride, $FeCl_2$, can be used under certain conditions for the chlorination and removal of only the titanium constituent of a titaniferous material such as ilmenite ore while leaving the iron as a metallic residue. Under otherwise similar conditions the use of $Cl_2$ and/or HCl alone would result in the conversion of all or at least nearly all of the iron to iron chlorides. In any event, the invention thus makes it entirely practical to directly and effectively recover the more useful titanium constituent of titaniferous materials, e.g., as relatively pure $TiCl_4$, without the production of appreciable quantities of unwanted iron chlorides. The advantages of the process, particularly when operated in conjunction with a chloride process for producing $TiO_2$, will be apparent to those skilled in the art.

DETAILED DESCRIPTION OF THE INVENTION

As indicated above, $FeCl_2$ can be used either alone or in combination with $Cl_2$ and/or HCl to serve as the chlorinating agent. As somewhat different processing conditions can be solved depending upon whether or not FeCl₂ is used alone, a general description of each embodiment will first be given.

In connection with the various embodiments it is noted there will be used the formula FeTiO₃ which is an idealized formula chosen to represent the titaniferous materials of interest. The empirical formula will vary, as is known, from one ore source to another. In this respect the term "ore" will be used herein in a general way since, while it is not essential that the titaniferous material be an ore, normally it will at least be derived from an ore source.

It is also noted that while it is not essential to selectively chlorinate every final trace of titanium in the ore, unconverted titanium represents a loss which is to be avoided as much as possible. Also it is not essential that every trace of iron in the ore be reduced to the metallic state. It is desirable to convert at least about 75% by weight of the titanium and iron in the ore to TiCl₄ and metallic iron, respectively, and it is to be understood that such a conversion is intended by the term "essentially completely" when used in this connection throughout this specification. Conversions of at least 85% by weight of the titanium in the ore, while producing at least a corresponding amount of metallic iron, are decidedly preferred for most purposes and normally these can be achieved without difficulty. But as a practical matter, and indeed this is one of the significant advantages of the invention, with most ores there is no problem in effectively and directly separating as an essentially pure TiCl₄ product more than 95% of the titanium in the ore, while leaving corresponding amounts of matallic iron.

Similarly, it is noted that when reference is made herein to the selective chlorination of the titanium constituent of the ore, this is not to be construed as necessarily precluding the net chlorination of minor quantities of other metals in the ore. Thus certain metals such as vanadium, which often may be found in minor percentages in titaniferous ores, tend to be chlorinated along with the titanium. Also, the desired product of the selective chlorination reaction, which is TiCl₄, can itself under certain conditions chlorinate some metallic iron. Of course, any net yield of iron chloride (as opposed to metallic iron) represents a condition which is to be avoided as much as possible since it represents a chlorine and iron loss and a disposal problem. A judicious selection of the process conditions in accordance with the disclosure herein makes it readily possible to operate such that the net yield of iron chloride does not exceed about 10% by weight of the iron in the titaniferous ore, hence the term "no appreciable net yield of iron chloride" is employed herein. Most often, as is preferred, the percentage will be 5% or less, an amount which for all practical purposes can be ignored. The term "net yield" is used so as not to exclude the possible temporary formation of iron chloride during an intermediate stage of the process.

FeCl₂ Chlorination Embodiment

In the case where FeCl₂ is used alone, the process of the invention can be expressed according to the following reaction (as in the case of all reactions in the specification, it will be referred to by Roman numeral designation): Net reduction/chlorination reaction:

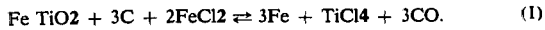
$$Fe\ TiO_2 + 3C + 2FeCl_2 \rightleftarrows 3Fe + TiCl_4 + 3CO. \quad (I)$$

Reaction (I) is in effect a net reaction as it is considered to occur in a series of individual reaction steps that can be expressed by the following:

Ilmenite reduction:
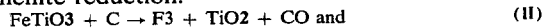
$$FeTiO3 + C \rightarrow F3 + TiO2 + CO \text{ and} \quad (II)$$

TiO₂ chlorination with FeCl₂:

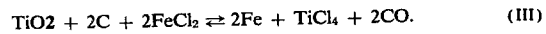
$$TiO2 + 2C + 2FeCl_2 \rightleftarrows 2Fe + TiCl_4 + 2CO. \quad (III)$$

The equilibrium conversion for Reaction (III) has been found to increase with temperature, as will be apparent from a later discussion of FIG. 4. In any case, as will be understood from the equations themselves, selective chlorination of essentially all of the titanium content of the ore would require that the atomic ratio of carbon to oxygen in the ore be at least 1:1, and the molar ratio of FeCl₂:titanium in the ore be at least 2:1. In actual practice it has been found that substantial amounts of trivalent titanium result from the reduction, and that the chlorination product often contains both TiCl₄ and TiCl₃. Hence it can be said that complete removal of the titanium content of the ore would require a FeCl₂:titanium molar ratio of about 1.5–2:1.

Reaction (I) is, of course, favored by using greater quantities of both carbon and FeCl₂ and such practice will be advantageous in many cases, e.g., for laboratory operations where economics are not of particular importance. For most commercial purposes, however, it will be desirable from a cost viewpoint to operate as closely as possible to the specified minimum molar ratios.

Regardless of the conversion efficiency, however, and essentially independent of temperature over the range of about 950° up to 1400° C., there is no appreciable tendency for iron chlorides to be formed, i.e., FeCl₂ will selectively attack the titanium constituent rather than the iron constituent.

Among the techniques for effecting Reaction (I) in accordance with this embodiment, one involves the use of FeCl₂ in the vapor phase and another the use of FeCl₂ in the melt phase. Examples 1 and 2 hereinafter represent these techniques respectively.

In the technique illustrated in Example 1, FeCl₂ is vaporized (m.p. 677° C. and b.p. 1026° C.) and brought into contact with a mixture of ore and carbon in a reactor. The TiCl₄ which forms is removed, for example, by the aid of an inert purge gas, and condensed. If desired, the ore/carbon mixture can first be heated to a temperature of 500° C. or more out of contact with FeCl₂ to initiate some prereduction, primarily of the iron content. While prereduction introduces an extra processing step, it can nonetheless be of advantage as will be described later.

In the technique illustrated in Example 2, the FeCl₂, ore and carbon are heated together in the same reactor, to form a melt. If the temperature is in the range of about 950° to 1026° C., the reaction will apparently proceed in a melt phase. Above 1026° C. the FeCl₂ will tend to boil and the reaction will at least partially occur in the vapor phase. If desired, however, a solid/liquid reaction mass can be maintained at temperatures in excess of 1026° C. by inclusion of a salt such as an alkali metal chloride or an alkaline earth metal chloride to act in raising the boiling point. Sodium chloride and potassium chloride are particularly preferred salts for this purpose because of their availability but other salts may be used provided they have a melting point below 950° C. and neither boil nor decompose at the reaction temperature employed. The amount of salt employed will effect the extent to which the boiling point of the mass is raised. Normally it should constitute 10 to 90% by weight of the contents in the reactor.

Regardless of the technique employed the embodiment is readily susceptible to being carried out on a continuous cyclic basis. Thus by removing that portion of the metallic iron made from the $FeCl_2$, it can be reacted with chlorine gas in accordance with the reaction:

$$Fe + Cl_2 \rightarrow FeCl_2. \qquad (IV)$$

followed by recycling of the ferrous chloride thus generated.

$FeCl_2/Cl_2$ Chlorination Embodiment

In the embodiment in which $Cl_2$ is utilized in combination with $FeCl_2$ as the chlorinating agent, the following generalized reaction can be given for chlorination of the titanium constituent while reducing the iron content to metallic iron:

$$FeTiO_3 + 3C + xFeCl_2 + 2Cl_2 \rightarrow Fe + TiCl_4 + xFeCl_2 + 3CO. \qquad (V)$$

Again, however, the mechanism is considered to involve Reaction (III) above; that is, conditions are employed whereby one takes advantage of the fact that $FeCl_2$ reacts with the titanium in preference to the iron and the additional $Cl_2$ is allowed to serve only as an auxiliary chlorinating agent for generating a supply of $FeCl_2$. In Reaction (V) the symbol $x$ represents a number which is no less than about 1.0 so that the molecular chlorine provides no more than 4 chlorine atoms per mole of $FeCl_2$.

For each value of $x$ an optimum temperature, $T_p$, can be ascertained at which the reaction will result in a minimum loss of iron, i.e., as iron chloride, from the iron constituent in the ore. For example, if $x$ is 2 such that 2 moles each of $FeCl_2$ and $Cl_2$ are present per titanium atom in a quantity of unreduced ilmenite ore, it has been established that $T_p$ occurs at a temperature of about 1225° C. Further details concerning the relationship of $x$ and $T_p$ will be given hereinafter with reference to FIGS. 5 and 6.

As will be apparent from Reaction (V), an essentially complete reaction is not possible unless the atomic ratio of carbon to oxygen in the ore is at least 1:1. While also seemingly there would be required at least 4 chlorine atoms from the chlorinating agent for reaction with each titanium atom in the ore, between 3 and 4 are actually required since, as mentioned before, some $TiCl_3$ is often produced. Preferably these conditions are constantly maintained throughout the duration of the reaction.

The amount of $Cl_2$ which is allowed to react with the ore must not be greater than 2 moles of $Cl_2$ per titanium atom in the ore, i.e., any amount of $Cl_2$ in excess thereof would be reacting with the iron constituent of the ore, even when operating at temperatures above $T_p$. Greater amounts of $Cl_2$ could, of course, be fed to a reactor provided that the dwell time therein was sufficiently short that the amount chemically combining with the ore did not exceed a molar ratio of 2 $Cl_2$ per titanium atom in the ore. While a selective chlorination of titanium is possible if the molar ratio of $Cl_2$ per titanium atom in the ore is less than 2, it is possible that there will result a net consumption of part of the $FeCl_2$ according to Reaction (I). Should the amount of $FeCl_2$ become unduly low while $Cl_2$ is present, iron chlorination could then result. Hence the ratio of 2 $Cl_2$ molecules per titanium atom in the ore represents a theoretically optimum operating ratio.

In the case where Reaction (V) is effected such that the values of $x$ and $T_p$ assure selective chlorination of the titanium constituent of the ore, it will be noted that no net consumption of or production of $FeCl_2$ is involved. In effect, for each two moles of $FeCl_2$ consumed in producing a mole of $TiCl_4$ in accordance with Reaction (III), two moles of $FeCl_2$ are produced from iron and $Cl_2$ in accordance with Reaction (IV). This is especially significant, for in practical terms it means that predetermined operating conditions can be selected which will enable a fixed quantity of $FeCl_2$ to be maintained while $Cl_2$, a widely available industrial chemical, is the only reactant that has to be furnished to an ore/carbon mixture.

As $FeCl_2$ and $Cl_2$ are known to be involved in an equilibrium reaction with ferric chloride, $FeCl_3$, at elevated temperatures in accordance with the following:

$$2FeCl_2 + Cl_2 \rightleftarrows 2FeCl_3, \qquad (VI)$$

it will be apparent that this embodiment can likewise be practiced using $FeCl_3$ and that Reaction (V) may be rewritten accordingly, e.g., as $$FeTiO_3 + 3C + 4FeCl_3 \rightarrow Fe + TiCl_4 + 4FeCl_2 + 3CO. \qquad (VII)$$

The utilization of $FeCl_3$ as a starting material can be of advantage from the standpoint that it is frequently available as an industrial by-product. As it has a comparatively low boiling point, 315° C., it can be employed in the vapor phase for contacting an ore/carbon mixture. Such practice is illustrated in Example 3, hereinafter. The generation of a stream of vaporous $FeCl_3$ from the reaction of $FeCl_2$ and $Cl_2$ in accordance with Reaction (VI) is also entirely practical, as will be illustrated hereinafter in Examples 4-9. It will be apparent that the procedures using $FeCl_3$ are readily susceptible to being carried out on a continuous cyclic basis, e.g., by removing $FeCL_2$ and reconverting it to $FeCL_3$ via Reaction (VI).

$FeCl_2/HCl$ Chlorination Embodiment

The comments given above with respect to the use of a $FeCl_2/Cl_2$ combination are largely pertinent, but with certain differences to be noted below, to the corresponding use of a $FeCl_2/HCl$ combination. In the latter case the reaction can be expressed by the following:

$$FeTiO_3 + 3C + XFeCl_2 + 4Cl \rightarrow Fe + TiCl_4 + xFeCl_2 + 3CO + 2H_2 \qquad (IX)$$

with $x$ beng, again, no less than about 1.0. One obvious difference is that hydrogen gas, $H_2$, occurs in the gaseous reaction product. This can be a disadvantage from the standpoint of the problem associated with the handling and disposal of a mixture of $CO/H_2$.

Perhaps a more significant difference is that when using HCl, as contrasted to using $Cl_2$, the conversion of HCl to $TiCl_4$ is incomplete. In other words the amount of chlorinating agent employed to chlorinate a given quantity of ore must be such as to being, more than 4 chlorine atoms per titanium atom in the ore. For example at a temperature of 1150° C., no less than 6.4 chlorine atoms must be furnished by the HCl per titanium atom in order for all of the titanium to be chlorinated. From the practical standpoint as regards a continuous cyclic process this simply means that some of the HCl could be recycled to achieve suitable economics. However, the selectivity of the chlorination process is not adversely affected.

A principal advantage to the use of HCl is that it is frequently available as an inexpensive off-gas from another chemical process. The HCl should, of course, be anhydrous to protect materials of construction from attack.

Further details concerning the use of HCl will be given hereinafter in Examples 10–13 and in connection with the explanation of FIGS. 9 and 10.

Other Chlorination Embodiments

Various combinations of $FeCl_2$, $FeCl_3$, $Cl_2$ and HCl can, within the limits described above, be employed in practicing the selective chlorination process of the invention. One such combination involves the use of a mixture of $FeCl_2/Cl_2/HCl$ as will be illustrated in Example 13, hereinafter. Again it is noted that advantageously no more than about 4 atoms of chlorine should be provided by $Cl_2$ and/or HCl per each mole of $FeCl_2$ to ensure that there is no appreciable net yield of iron chloride from the iron constituent of the ore. Any amount of $FeCl_3$ in the chlorinating agent is, as noted above, considered as contributing $FeCl_2$ and $Cl_2$ in a molar ratio of 1:0.5.

The formula $FeCl_3$ is used throughout this specification for convenience to designate ferric chloride both as such and as the well-known dimer, $Fe_2Cl_6$.

DESCRIPTION OF THE DRAWINGS

The invention will be further illustrated with reference to the Drawings.

FIGS. 1, 2, 3 and 3(a) illustrate various forms of laboratory apparatus, shown schematically and not to scale, that may be used for carrying out the reduction/selective chlorination process of the invention.

Referring to FIG. 1, there is employed a simple type of fixed bed reactor constituting elongated silica tube 10 in which an iron chloride charge, i.e., one of $FeCl_2$, $FeCl_3$ or an $FeCl_2/FeCl_3$ mixture, and an ore/carbon mixture are placed. These may be maintained in their respective positions by means of silica wool 12 or similar porous material. A stream of inert gas such as argon, helium or the like enters through line 13 to serve as a purge in the system to aid in withdrawing and collecting $TiCl_4$ produced. Exit gases are carried out through line 14. A stationary heater or furnace 15, shown partially cutaway, is adapted to receive and enclose the elongated silica tube 10. The heater, which may be for example an electric heater of several sections will typically be equipped with a thermocouple or other device, not shown, to measure and record a predetermined temperature to be applied to the charges. In operation the charges are placed in the tube as shown, the flow of purge gas is commenced and the tube is inserted sufficiently into the heater that the ore/carbon blend is first brought to temperature. At temperatures below 950° C., some reduction of the ore may commence. The tube is then further inserted into the furnace so that the iron chloride charge is caused to vaporize. Slow continual insertion of the tube into the furnace, i.e., left to right in the drawing, results in a stream of $FeCl_2$ and/or $FeCl_3$ vapor being generated and passed into contact with the ore/carbon mixture. Some iron chloride and/or other materials may be found to be condensed on the walls of tube 10, but in any event, an exit gas results which is composed of inert gas, $TiCl_4$ and, possibly, some iron chloride as normally it would be used in excess with such an apparatus. The exit gas, and more importantly, the $TiCl_4$ constituent, can be collected by any suitable means, not shown. A simple ice bath condenser arrangemnt of the type described hereinafter for FIGS. 2 and 3 may be employed for this purpose.

FIG. 2 illustrates a form of laboratory apparatus that may conveniently be used for effecting Reaction (I) using molten $FeCl_2$. The principles involved therewith are readily susceptible to use on a large scale, either batchwise or on a continuous basis. In this case vertical silica tube 40, equipped with silica stirrer 41 and seal 42 is surrounded at its base by electrically heated furnace 43. A thermocouple 44 measures temperature applied to the contents in tube 40. Inlet 45 is for introduction of an inert purge gas. Product gas, after being filtered by silica wool pad 46 passes through arm 47 so that $TiCl_4$ product is condensed by ice-salt bath 48 and collected in calibrated receiver 49. In operation the tube 40 is provided with a charge or ore, carbon and $FeCl_2$. An inert salt such as potassium chloride, can be used in any convenient ratio with the $FeCl_2$, preferably in a 1:1 approximately equal weight ratio, to suppress the partiaL pressure of $FeCl_2$, thereby keeping it from boiling. When using such a salt, there may be some tendency to obtain $TiCl_4$ in less than stoichiometric yield because of competition between Reaction (III) and the following:

$$TiO_2 + 2C + 3/2FeCl_2 \ominus 3/2Fe + TiCl_3 + 2CO \qquad (VIII)$$

The $TiCl_3$ typically forms a copmplex with the salt which tends to remain with the bed residue. On leaching with water, however, the complex is readily solubilized and the titanium can be recovered, as a hydrolyzate.

Figure 2:
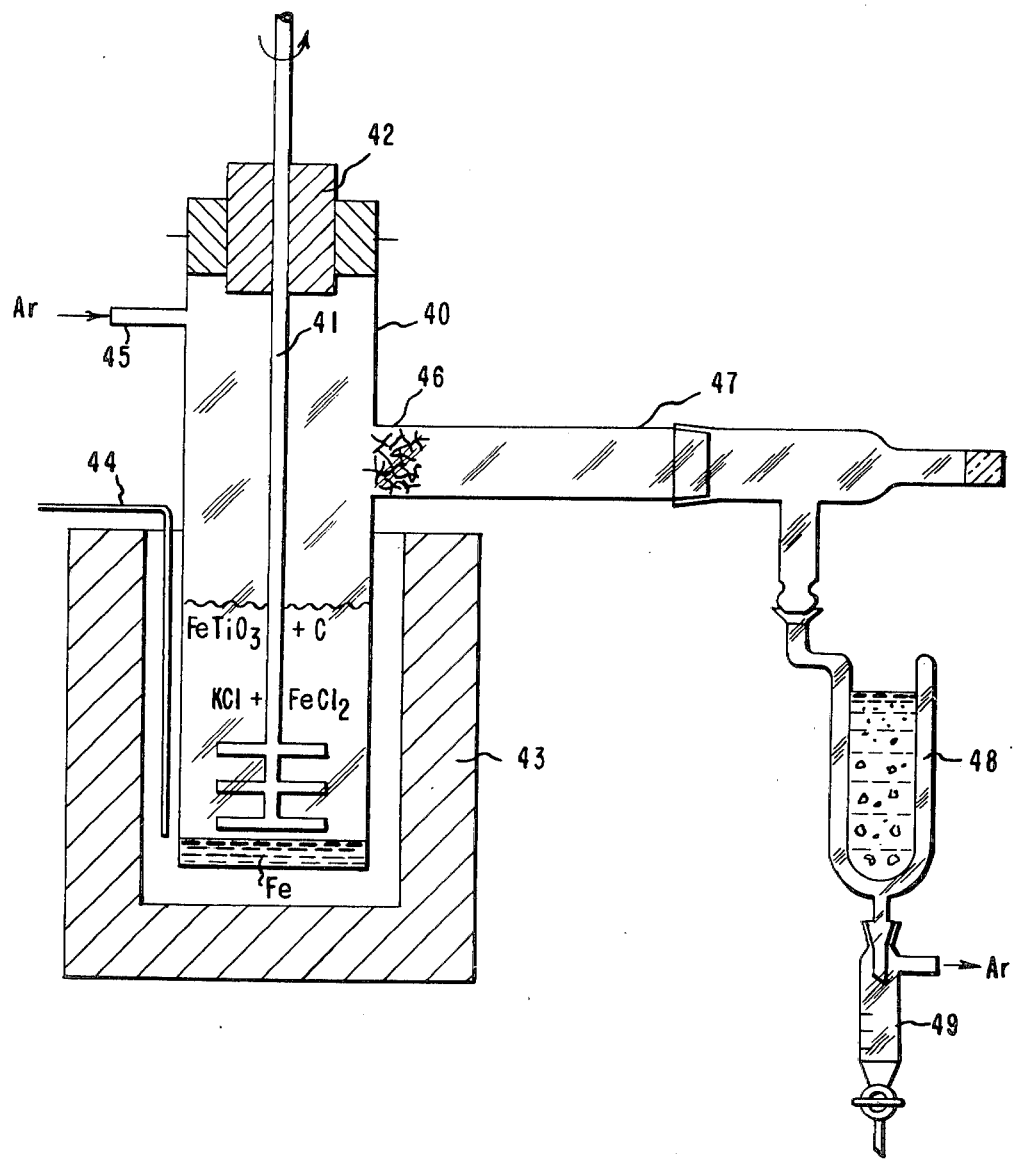

In using the device of FIG. 2, the charge of ingredients is placed in tube 40 and heating is commenced to bring the temperature up to at least 950° C. while inert gas is passed through the system and liquid $TiCl_4$ is collected in receiver 49. When salt is used and the temperature exceeds 1145° C., metallic iron coalescence has been observed in the base of the tube reactor 40. It will be apparent that for a larger size unit, it is entirely practical to devise modifications for continuous introduction of ore, carbon, $FeCl_2$, and optionally salt while withdrawing separate streams of $TiCl_4$ and molten iron.

Figure 3:
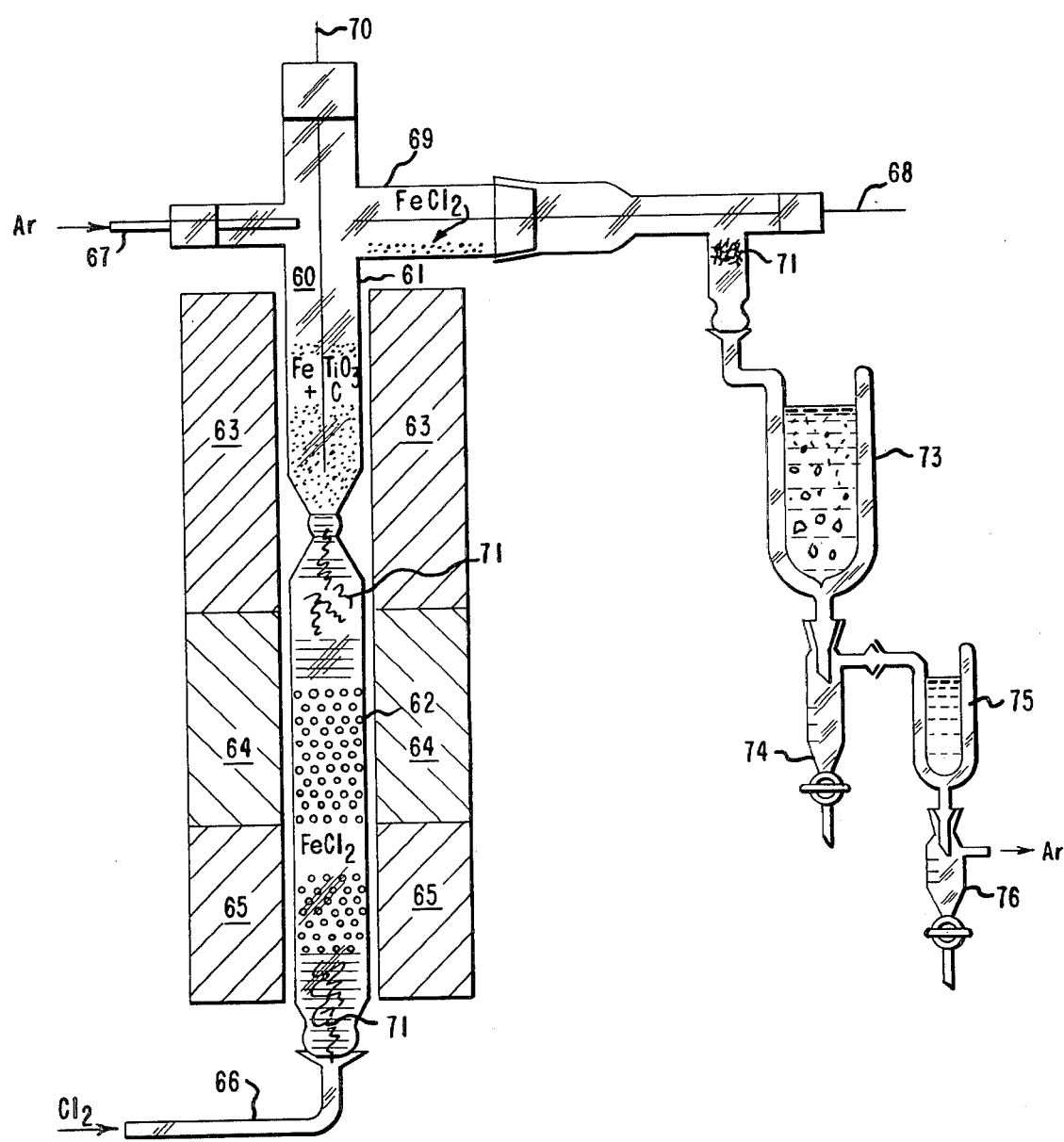

FIG. 3 shows a vertical silica reactor that can be used to react a bed of ore and carbon in a steady stream of $FeCl_3$. The apparatus demonstrates what, on a large scale, could be performed in a shaft furnace. In this case the reactor, shown generally as 60, is composed of upper section 61 and lower section 62 positioned within a furnace composed of sections 63, 64 and 65. In the lower portion of the reactor 62 a bed of solid $FeCl_2$ is contacted with a metered quantity of $Cl_2$ gas entering through line 66. The two react and the resultant $FeCl_3$ vapors then pass upwardly into contact with the ore/carbon mixture.

Also in FIG. 3, inert gas can be introduced at line 67, and manually operated plunger 68 can be used to prevent pluggage in arm 69 by $FeCl_2$. The temperature of the reactor is measured by thermocouple 70 and silica wool pads 71 are used as shown to maintain the materials in place in reactor 60 and to assist in preventing the passage of blowover particles from the bed. The collection system uses a salt/ice bath 73 to collect $TiCl_4$ in calibrated receiver 74. Optionally, any remaining $TiCl_4$ can be captured by means of auxiliary condenser 75 and receiver 76.

In operation of the device of FIG. 3, ore and carbon in the desired particle size and proportions are mixed and placed in upper reactor section 61. The lower section 62 is filled with a column of crushed $FeCl_2$. Moisture and $FeCl_3$ traces can be removed from the reactor by applying heat but below the boiling point of $FeCl_2$ while an argon purge is maintained through line 66. Then the temperature of the upper section is raised, e.g., to 950° C. or above to commence prereduction of ore and the liberation of $TiO_2$. This heating may be continued for an hour or more to effect an essentially complete reduction of the iron. During the process carbon monoxide forms and can be collected or burned at the off-gas outlet in receiver 76. Chlorination is then commenced by discontinuing the argon purge and metering $Cl_2$ at the desired rate into the $FeCl_2$ bed. Argon may be passed into the system at 67 to prevent pluggage. At the end of run the $Cl_2$ gas is shut off, and an argon purge is resumed through line 66 to remove volatile chlorides. The $TiCl_4$ is collected in the calibrated receivers 74 and 76 and analyzed. The reacted bed is removed from tube 60, washed with water and analyzed for iron and titanium.

Figure 3A:
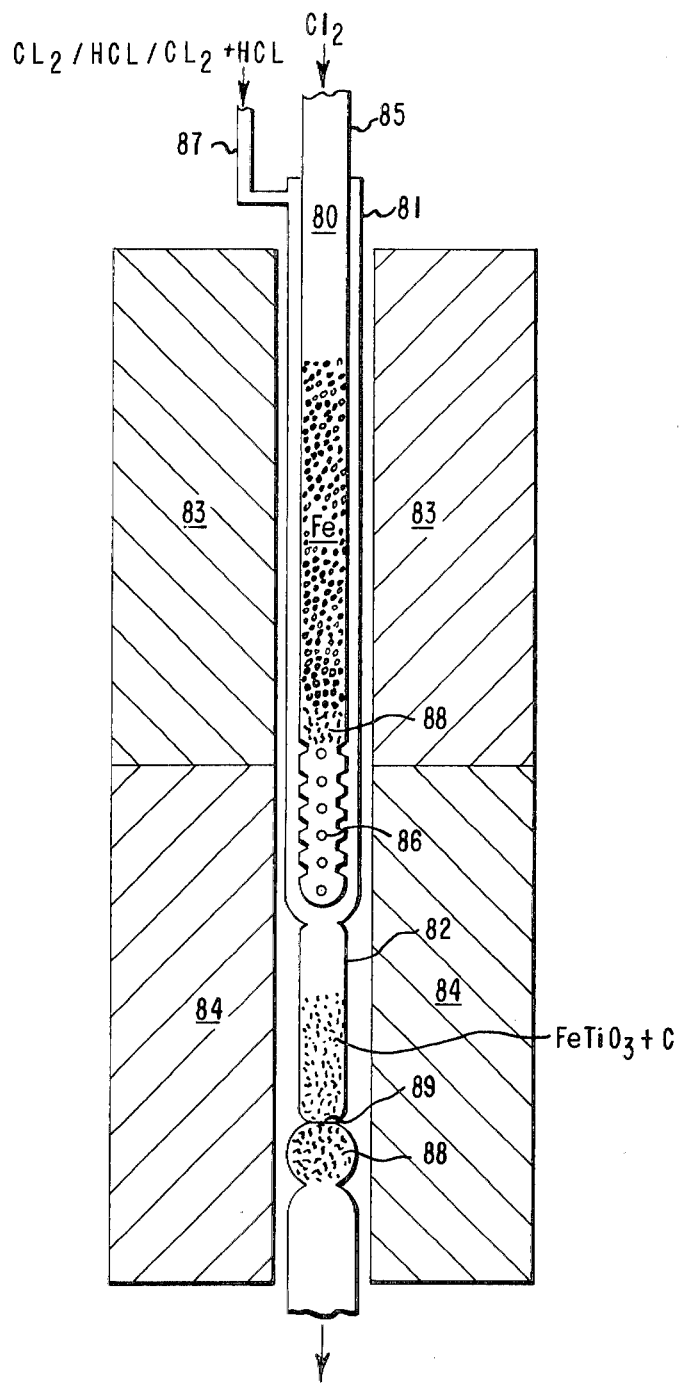

FIG. 3a is a variation of the reactor portion of a device similar to that of FIG. 3 for use where it is desired that the chlorinating agent be $FeCl_2$ in combination with $Cl_2$ and/or HCl. In this case a vertical silica reactor shown generally as 80 is composed of an upper section 81 and a lower section 82 positioned within a furnace composed of sections 83 and 84. A stream of $Cl_2$ gas in a predetermined amount enters tube 85 and passes through a bed of small heated spherical iron particles thereby generating a flow of $FeCl_2$ vapor which passes outwardly through perforation 86 in the wall of tube 85. The $FeCl_2$ is mixed with a predetermined amount of $Cl_2$ and/or HCl which enters the reactor through tube 87 and the mixture passes into contact with the ore/carbon blend in the lower section 82 of the reactor. The $TiCl_4$ can be collected as before. Inert gas can be introduced through either or both of tubes 85 and 87. Silica wool pads 88 and porous silica frit 89 aid in maintaining the materials in place in the reactor.

FIG. 4 illustrates the equilibrium conversion when $FeCl_2$ is the only chlorinating agent, i.e., when carrying out the process indicated in Reaction (III) using excess $TiO_2$ and carbon. Therein percent $FeCl_2$ conversion is plotted versus temperature of the reaction and the conversion will be seen to increase with increasing temperature. In general below 950° C. the conversion is sufficiently poor as to make such operation unattractive, whereas above 1400° C., any added gain is inadequate to offset the higher heating costs that would be involved. Using $FeCl_2$ in this manner, the temperature range of 975° to 1325° C. is the most practical. It will be noted in FIG. 4 that there is close correlation between values determined experimentally and those calculated, i.e., calculated from published equilibrium data.

Figure 5:
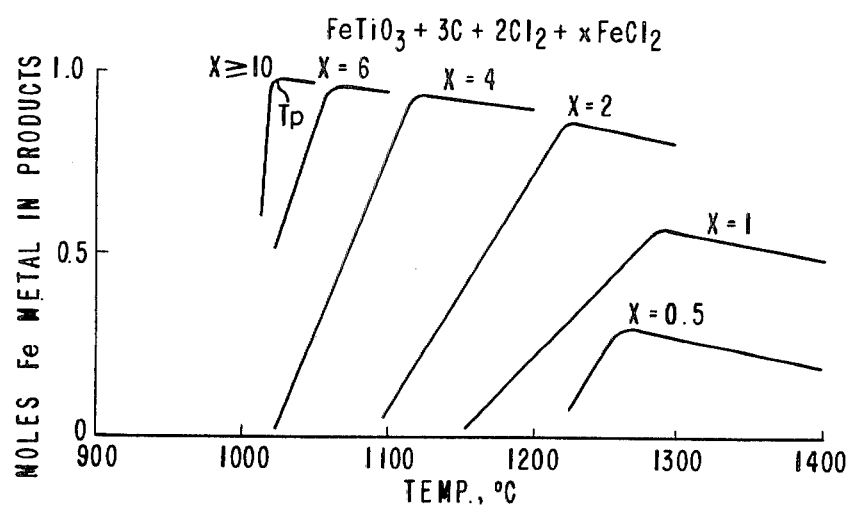

FIGS. 5 though 10 are plots of calculated amounts of metallic iron remaining at equilibrium when the reactants are as indicated for each plot and the operations take place at one atmosphere pressure. The calculations are based on published thermodynamic data, primarily *JANAF Thermochemical Tables*, 2nd Edition NSRDS-NBS 37, by Stull and Prophet.

FIG. 5 indicates the selectivity of the process of the invention when a combination of $FeCl_2$ and $Cl_2$ is present as the chlorinating agent for reaction with a titaniferous ore according to Reaction (V). Thus a value for $T_p$ can be ascertained for any convenient value of $x$ (moles of $FeCl_2$ which is selected. Where $x$ is 10.0, for example, (hence a 5:1 molar ratio of $FeCl_2:Cl_2$) it will be seen that with a reaction temperature at the peak of the curve, $T_p$, which is about 1025° C., there is virtually no amount of iron in the ore which is lost as iron chloride instead of being converted to iron metal, i.e., essentially each mole of iron in the ore is accounted for as iron metal in the product. By the same token it will also be seen that at somewhat lower temperatures, only nonselective chlorination will occur. That the $T_p$ value therefore represents an optimum condition is apparent since progressively increasing temperatures tend to favor the loss of iron metal. In the case where $x$ is 4.0, the molar ratio of $FeCl_2:Cl_2$ is 2:1, or that which is obtained on using $FeCl_3$ as the source of chlorinating agent, in which event $T_p$ occurs at about 1125° C. A preferred operating range for such a case is 1100° to 1250° C.

Any chemical reduction of the ore prior to contact with $FeCl_2$ and $Cl_2$ would usually have the effect of shifting the curves so that lower $T_p$ values result. This is demonstrated in FIG. 6 for the prereduced system Fe + TiO. Thus $T_p$ in the case where $x$ is 4.0 now occurs at about 1025° C., or nearly 100° lower than for the situation with unreduced ore as depicted in FIG. 5. The gain in lower $T_p$ with prereduced ore is, of course, at least patially offset by the cost of a separate heating step. It will be understood that the formula TiO is an idealized designation used to represent the titanium oxide content of all such prereduced ores. In fact mixtures of various titanium oxides would usually be present, possibly titanium carbide as well and, depending upon the extent of the prereduction, the atomic ratio of Ti:O therein can be essentially any value above 0.5. Thus the ratio need not necessarily be 1.0 as indicated by the formula TiO.

Figure 6:
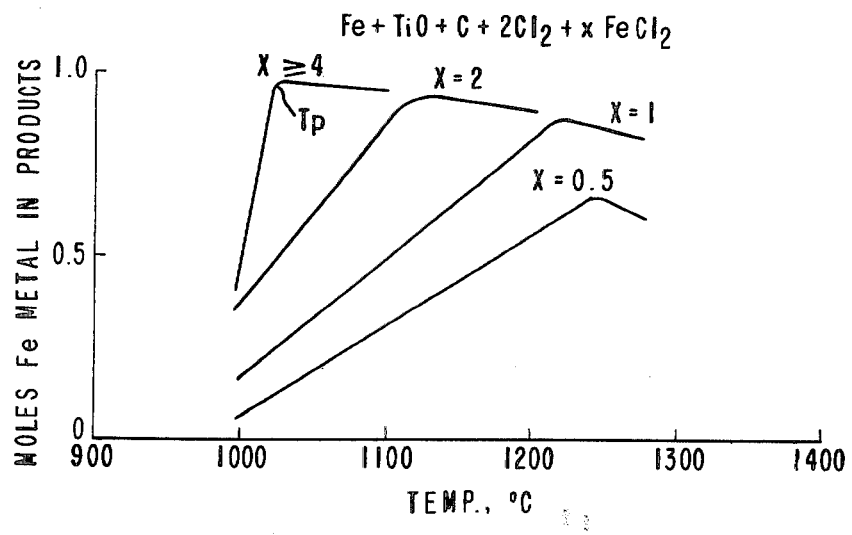

On the basis of the data given in FIGS. 5 and 6, it is concluded that for effective selective chlorination of the titanium constituent of an ore without an appreciable net yield of iron chloride from the iron constituent of the ore, $x$ should not be less than about 1.0. In other words there should be no more than about 2 moles of $Cl_2$ (or 4 atoms of chlorine therefrom) present per mole of $FeCl_2$. Similarly it is concluded that such selectivity requires a temperature within the range of about 950° to 1400° C. While in certain cases lower amounts of $FeCl_2$ can be used and some measure of preferential attack for titanium still achieved, there is no advantage in doing so, particularly since any loss of excess $FeCl_2$ can be avoided. As regards temperature, it will be understood that while the range of 950° to 1400° C. is stated as applicable, those skilled in the art will understand that for any given value of $x$ from about 1.0 up there will be a minimum temperature within that range, ascertainable from FIGS. 5 or 6 or their equivalent, which must be at least met in order to achieve the dessired selectivity. As a general rule, the use of temperatures beyond 1400° C. proves economically unattractive as involving additional costs without particular benefit. Usually it is desired to operate with an $x$ value of about 1.5 to 4, or a molar ratio of $FeCl_2$ to $Cl_2$ of 0.75:1 to 2:1, and with a temperature in the range of 1000° to 1300° C.

It is in fact possible, by suitable adjustment of the molar ratio of $FeCl_2:Cl_2$, to operate under conditions whereby 100% of the iron in the ore, or any other desired percentage, is formed. This will be apparent from FIG. 7 which exemplifies a portion of the $x = 2$ curve of FIG. 5 using somewhat less than 2 moles of $Cl_2$ for each 2 moles of $FeCl_2$. As is seen therefrom, a virtually stoichiometric recovery of all iron in the ore as metallic iron can be achieved at a temperature of 1240° C. using a chlorinating agent composed of 2 moles $FeCl_2/1.84$ moles $Cl_2$ or at a temperature of 1230° C. using a chlorinating agent composed of 2 moles $FeCl_2/1.76$ moles $Cl_2$. It will be recognized that the other curves of FIGS. 5 and 6 are merely representative and that for each one given there is in fact a family of curves of variious possible $FeCl_2:Cl_2$ molar ratios. Clearly the molar ratio of $FeCl_2:Cl_2$ is a key factor since by suitable selection thereof, and of course depending upon other conditions such as temperature and the extent to which the ore may have been prereduced, it is entirely practical to operate such that any desired amount of iron in the ore is recovered as metallic iron while chlorinating the titanium values to yield $TiCl_4$ and $TiCl_3$.

Figure 7:
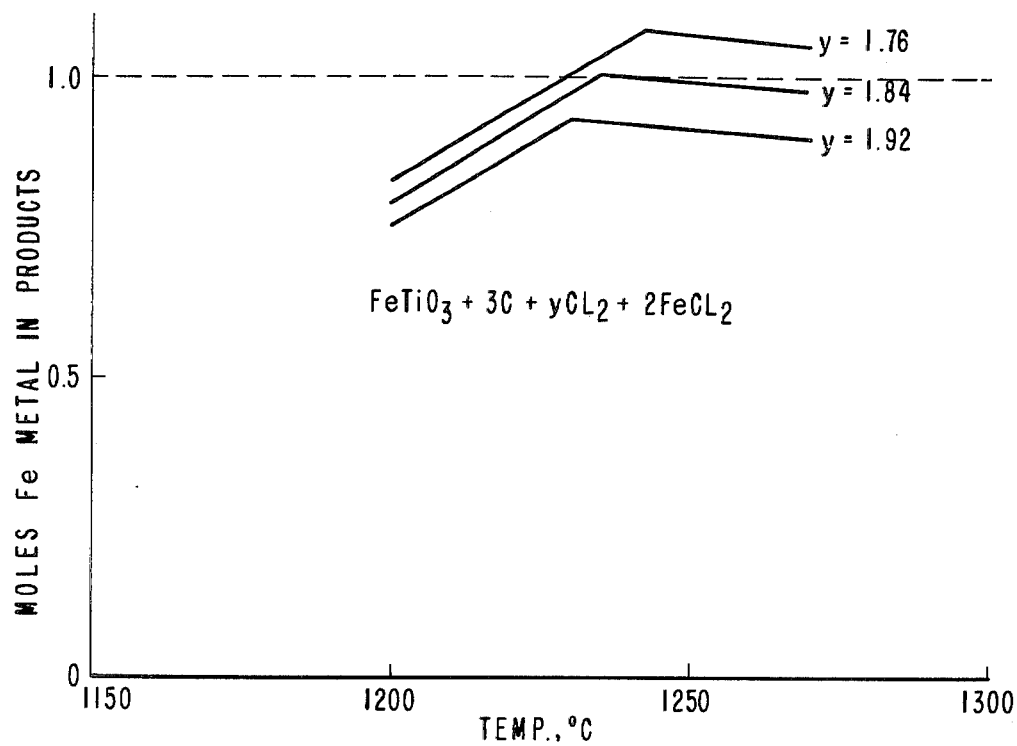

With regard to FIG. 7 it will be noted that in the situation where $y = 1.76$, a condition prevails above a temperature of 1230° C. in which the amount of metallic iron recovered is actually greater than the amount initially present in the ore. This is for the reason that a portion of the $FeCl_2$ in the chlorinating agent is consumed under these conditions, i.e., is converted to metallic iron without a corresponding amount of $FeCl_2$ being formed. While in many ooperations it would be preferred to operate under such conditions that the level of $FeCl_2$ remains constant, i.e., so that it does not have to be produced in a separate operation and added, there can be occasions where its deliberate consumption would be desirable. One such occasion would be where $FeCl_2$ was available as a waste or low-cost by-product from some other process.

Figure 8:
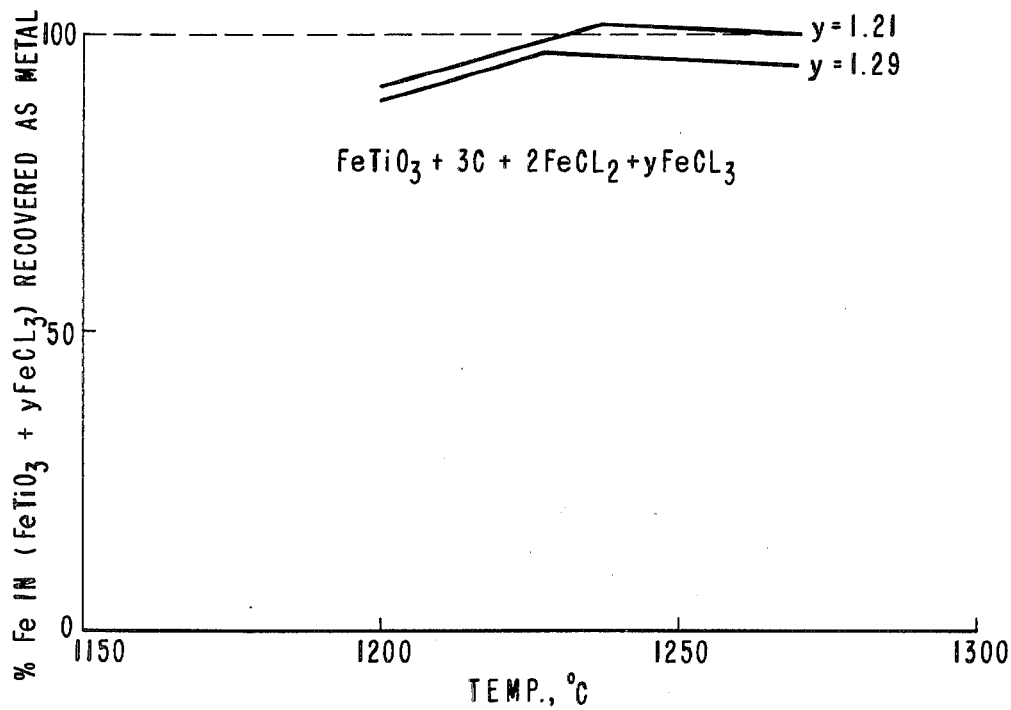

As $FeCl_3$ is the equivalent of a $FeCl_2/0.5\ Cl_2$ mixture, it is also practical to utilize conditions wherein $FeCl_3$, e.g., as a by-product from a chloride-$TiO_2$ process, is deliberately consumed in the chlorination while the $FeCl_2$ level stays constant. This is illustrated by FIG. 8. Thus at a temperature of about 1230° C. or higher the iron content of the ore as well as the iron content of the $FeCl_3$ is wholly converted to metallic iron using a chlorinating agent composed of 2 moles $FeCl_2/1.21$ moles $FeCl_3$. The reaction would be written as follows:

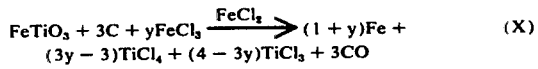

$$FeTiO_3 + 3C + yFeCl_3 \xrightarrow{FeCl_2} (1+y)Fe + (3y-3)TiCl_4 + (4-3y)TiCl_3 + 3CO \quad (X)$$

In effect, then, a continuous ore chlorination can be carried out to produce $TiCl_4/TiCl_3$ as the desired product while the only chlorine-containing reagent being supplied to the process is $FeCl_3$.

Figure 9:
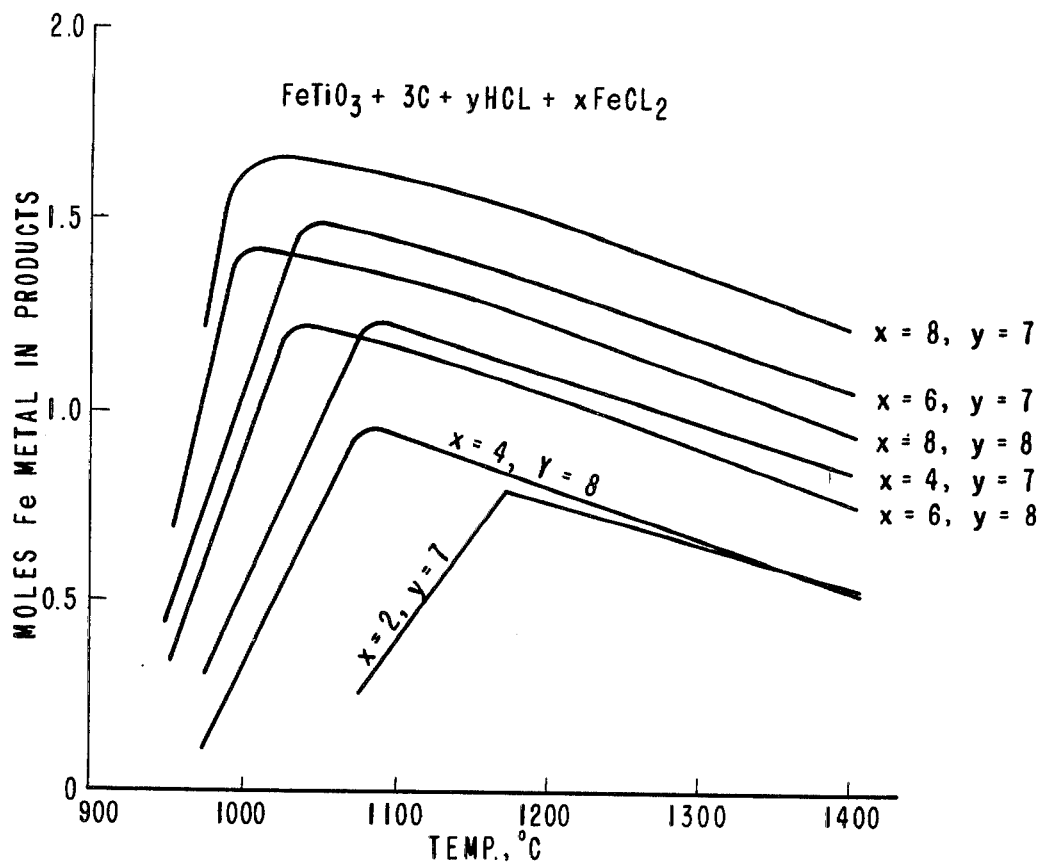
Figure 10:
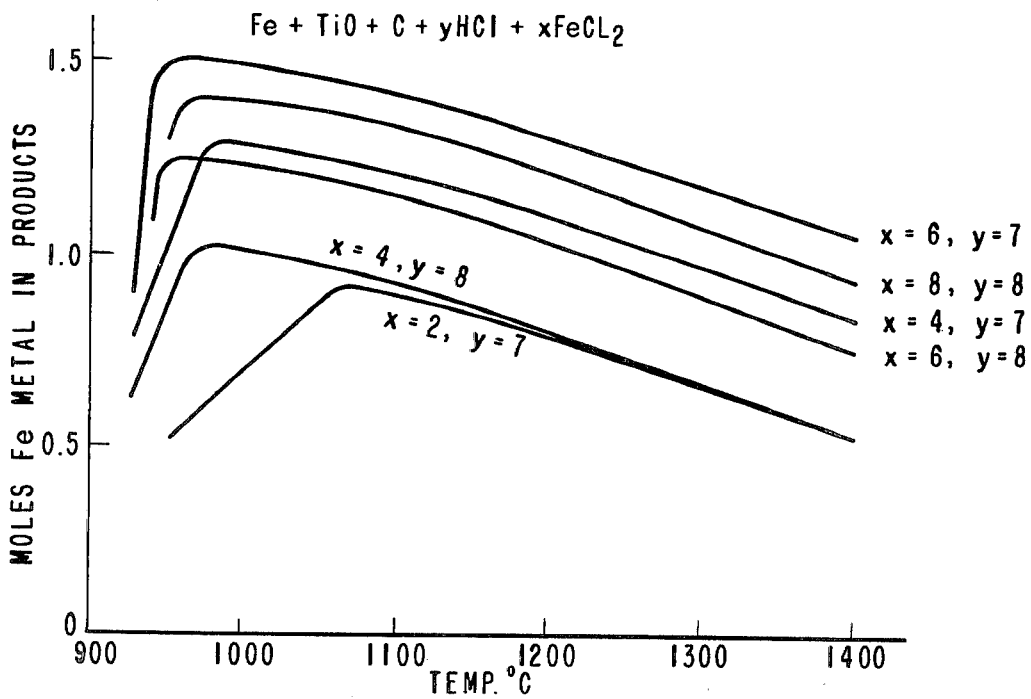

FIGS. 9 and 10 correspond to FIGS. 5 and 6, i.e., using nonreduced ore and reduced ore, respectively, when HCl replaces $Cl_2$ in the selective chlorinaion process of the invention. In each instance a family of curves is shown to exemplify the effect of varying the molar ratio of $FeCl_2/HCl$. Again, the ratio employed should not be less than about 1:4 to ensure that the titanium constituent of the ore will be chlorinated in preference to the iron constituent.

DETAILED PROCESS DESCRIPTION

The titaniferous material employed in the practice of the invention may be iron/titanium oxidic ores obtained from a wide variety of sources or they may be other iron oxide and titanium oxide containing materials. It will be apparent that since the process of the invention involves the selective chlorinaion of the titanium constituent, low grade ores containing relatively high amounts of iron can readily be treated.

For convenience, the formula $FeTiO_3$ has been used herein to describe the titaniferous materials of interest for practice of the invention. This is the formula typically ascribed to true ilmenite ores, which contain about equimolar amounts of iron and titanium. In practice, any titaniferous material may be utilized provided it contain sufficient titanium to make its recovery economically attractive. Materials containing at least 10%, and preferably at least 20%, by weight of titanium are thus best employed. The amount of iron in the material will also usually be at least 10%, typically at least 20%, by weight but there is no practical reason why orescontaining much less iron cannot be processed. The oxidic titaniferous ores referred to generally as ilmenite ores and containing about 20 to 50% titanium and 10 to 50% iron represent a preferred titaniferous material for use in the invention because they are widely available at a relatively low cost such that the recovery of the titanium can be most economically performed. It is to be understood, however, that the various types of ilmenite ores, rutile ores, slags and residues, including mixtures of any such materials, may also be effectively treated in accordance with the invention.

It will be understood that the actual reactions which occur in the course of the reduction/selective chlorination process of the invention can be highly complex ones depending upon the chemical composition of the titaniferous material employed. In this respect the reactions set forth in this specificaion are intended to be representative of the primary chemical changes which occur and should not be interpreted as excluding the possibility that secondary or side reactions may also occur. For example it can happen that certain other metals in the ore may be chlorinated or even reduced to a metallic state.

In general it is desired that the titaniferous material be in a particulte or at least porous form so that sufficient surface area is accessible for the reduction and selective chlorination reactions to take place at reasonable rates. Sand ores and the like, because of their small particle size, can typicaly be used as such without further size reduction. Some form of grinding step is generally necessary with massive ores, however, in which case the extent and cost of grinding will have to be balanced against the extent to which the reaction rate will be benefited. Particles on the order of 1 mm. or less are generally the most useful. For convenience, a particulate material can be formed into briquettes, e.g., with carbon and binders if necessary.

The particulate carbonaceous material employed in the practice of the invention may be carbon as such, e.g., charcoal, coal, or coke, or it may be any other material which on heating will produce carbon or carbon compounds in a form suitable as a reducing agent.

Materials composed essentially of carbon are preferred in order to reduce or eliminate any side reactions. Preferably, the carbonaceous material will also be used in particulate or at least porous form in order to provide a high degree of surface area. However, depending upon the apparatus employed, powders or other excessively small size particles of cabon, i.e., those below 50 $\mu$, may tend to result in an excessively high blowover from the reactor. For this reason somewhat larger particles of carbon, i.e., of 0.1 to 10 mm., are the most useful, especially when the particles are of a porous character.

As indicated hereinbefore, the atomic ratio of carbon in the carbonaceous material to the oxygen in the titaniferous material must be at least about 1:1 for practice of the present invention. A prereduced ore will require a lesser amount of carbon than the same ore would if not prereduced. In any case, with lower amounts of carbon than that required for stoichiometric reaction, the conversion of titanium to its chloride will be less than complete. In general it is preferable to carry out the process using at least a 10% excess of carbon over that which would be required to react with all of the oxygen in the ore.

The total amount of chlorinating agent employed in carrying out a manufacturing process of the invention should, of course, be sufficient to permit chlorination of essentially all of the titanium content of the ore. Where only $TiCl_4$ is produced this would mean about 4 chlorine atoms per titanium atom. As $TiCl_3$ can be a product as well, the theoretical range is 3 to 4 chlorine atoms per titanium atom. Lower amounts can be present if all the titanium need not be chlorinated, i.e., when unreacted ore is being recycled. Higher amounts can be present if the conversion is kept low, i.e., when recycling with a relatively short dwell time in the reactor.

For reasons of efficiency it is desirable, if not necessary, to insure that during the reduction/selective chlorination process moisture and other materials that might consume a portion of chlorinatng agent are not present in the reactor.

The process of the invention can be carried out using a wide variety of reactors either on a batch basis or a continuous basis. Fluid bed operations are advantageous for continuous operation but care must be exercised to avoid excessive aggregation of particles. In this regard the apparatus illustrated in FIG. 2, using a melt of ferrous chloride, with or without a salt, is highly advantageous in that it can be carried out on a continuous basis utilizing means for removal of the molten iron which separates.

Depending upon the type of apparatus employed, and the way that the various reactants are supplied and intermixed, the requisite proportions of ore, carbon and chlorinating agent specified herein need not necessarily be maintained throughout the duration of the reaction. For example, procedures can be devised for intermittent addition of one or more materials and/or for the withdrawal and recycling of one or more materials.

The process of the invention will be exemplified by procedures operating at atmospheric pressure, or slightly thereabove. Subatmospheric or superatmospheric pressure can be used, however.

It is to be noted that regardless of the nature of the apparatus employed, difficulty can be experienced in collecting as such the entire quantity of $TiCl_4$ generated in the process. This is particularly true for laboratory or other small scale operations as the usual condensation techniques tend to allow some $TiCl_4$ to be lost, either to the atmosphere or by reaction with moisture. For this reason, it is frequently more accurate to ascertain the percent titanium chlorinated from the guantity of titanium which remains as a residue. The examples hereinafter indicate conversions which have been determined in this way. The practice may, on the one hand, involve igniting the residue of the ore/carbon mixture to burn off carbon followed by chemical annalysis for iron and titanium. These would then be compared with the original ore analysis. Alternatively, the residue may be subjected to magnetic separation to remove carbon and other nonmagnetic materials from the iron/titanium portion followed by analysis of the fractions.

While I do not wish to be bound to any specific explanation of the theory of the process of the invention, the more significant features and reactions appear to be as follows: The titaniferous ore is first reduced to iron metal and to trivalent titanium oxide with C0 being the active reducing agent. Carbon initiates this reduction and its presence in a high level ensures that all of the titanium will at some point be reduced to the trivalent state. This reduction of the titanium oxide to the trivalent state is necessary to allow reaction with $FeCl_2$. The trivalent titanium oxide is chlorinated by this reaction with $FeCl_2$ and undoubtedly with other chlorine-containing compounds. The $FeCl_2$ does not, however, attack the iron in the ore. $Cl_2$ and/or HCl react with a portion of the iron metal to regenerate $FeCl_2$ and maintain it at a high level.

The invention is further illustrated by the following examples in which parts and percentages are by weight unless otherwise specified. The $TiO_2$ and total Fe values reported for ore analyses should be considered accurate within about two percentage points owing to variations from one sample to another. Mesh sizes therein refer to U.S. Standard Sieve sizes.

EXAMPLE 1

A 30.0 g. sample of Allard Lake ilmenite (analyzing 39% $TiO_2$, 44% total Fe and containing minor amounts of MgO, $Al_2O_3$, and $SiO_2$) is ground to -325 mesh size, blended with an equal weight of dried particulate carbon and placed in an elongated silica tube (of 42 mm. inside diameter) as shown in FIG. 1. The blend, which fills the cross-section of the tube, is held in place with silica wool.

The carbon is a standard laboratory grade charcoal (sold by Fisher Scientific Company, Fair Lawn, New Jersey, U.S.A., under the trademark Darco G-60 activated carbon). It is characterized by a particle diameter of much less that 400 mesh and a surface area of about 650 $m^2g$.

Then 250.0 g. anhydrous $FeCl_2$ is spread on the bottom of the same tube between silica wool pads as shown in FIG. 1. The calculated atomic ratio of carbon:oxygen (in the ore) is 4.3 and the molar ratio of $FeCl_2$:Ti (in the ore) is 13.6.

The tube is then inserted into a two-section furnace so that the $FeCl_2$ charge is heated to about 507° C. to remove moisture while the ore/carbon mixture is only at about 200° C. The tube is then partially withdrawn and the furnace temperature raised. The initial section, where $FeCl_2$ vaporizes, is at about 1049° C., whereas the following section, where chlorination occurs, is at about 1153° C. At this time the $FeCl_2$ is outside the furnace while the ore/carbon is at about 1153° C. The tube is then gradually moved into the furnace over a period of 120 minutes (left to right in the FIG. 1) to generate a stream of $FeCl_2$ vapor.

Throughout the heating process a stream of argon gas, as a purge, is passed through the tube at a rate of about 205 cc./min., measured at room temperature. At the end of the run the argon stream is used to free the residual ore/carbon bed from gaseous chlorides. Throughout the run, exit gas from the tube is cooled by an ice bath to condense $TiCl_4$ in a calibrated receiver as an essentially pure liquid.

The bed residue, after ignition at about 900° C. in air, weighs 40.9 g. and contains 27.6 g. Fe and about 1.5 g. $TiO_2$. It is calculated that 87.4% of the titanium in the ore has been chlorinated. (While the amount of titanium collected as $TiCl_4$ is somewhat lower this is only because of the inefficiency of the collection device.) It is also calculated (considering the original iron content of the ore, the iron produced as a result of Reaction (III), and the quantity of iron in the ignited bed residue) that none of the iron in the core has been chlorinated.

It is apparent that a selective chlorination of the titanium content of the ore has taken place leaving the original iron content as a metallic iron residue.

EXAMPLE 2

A 200.0 g. sample of purified anhydrous $FeCl_2$, 200.0 g. of KCl, 50.0 g. of ground Allard Lake ilmenite as described in Example 1 and 50.0 g. of carbon, also as described in Example 1, are blended with a mortar and pestle and placed in silica reactor as shown in FIG. 2. The temperature of the mixture is then raised while maintaining a purge with argon at a rate of 125 cc./min. measured at room temperature.

The blend contains an atomic ratio of carbon to oxygen (in the core) of 4.3 and a ratio of moles of $FeCl_2$ to atoms of Ti (in the ore) of 6.5.

The heating is initially conducted until, at a temperature of less than 800° C., the KCl and $FeCl_2$ form a melt. The stirrer is then started and the temperature is raised to 1305° C. over 2 hours and is maintained at that temperature for another 2 hours. During the heating some of the $FeCl_2$ vaporizes but is condensed on the cold reactor walls and is thereby returned to the salt melt. The $TiCl_4$ vapors that form ar led off to be condensed in a cold trap. Part of the chlorinated titanium is retained in the melt as $TiCl_3$, either as such or as a complex with KCl. Molten carbon-containing metallic iron collects at the bottom of the reactor.

Upon cooling, the metallic iron is physically separated from the salt melt. In this way 40.9 g. metal analyzing 96% Fe and 0.16% Ti is obtained. On the basis of the amount of iron in the initial ore charge and the amoung of $FeCl_2$ converted to metallic iron, it is calculated that more than 80% of the titanium content of the ore has been chlorinated. (The iron analyses do not provide a more precise value since both $TiCl_4$ and $TiCl_3$ are observed as reaction products).

Regardless of the form of the titanium chloride, it is apparent that a selective chlorination of the titanium content of the ore has taken place.

EXAMPLE 3

A 50.0 g. sample of Allard Lake ilmenite (analyzing 37% $TiO_2$, 44% total Fe, and containing minor amounts of MgO, $Al_2O_3$, and $SiO_2$ and ground to −325 mesh size) is blended on a roller with 41.4 g. carbon (as employed in Example 1) and placed in an elongated silica tube of 42 mm. inside diameter as described in Example 1 and FIG. 1. The atomic ratio of carbon to oxygen (in the ore) is 3.6.

The reduction/selective chlorination reaction is carried out at 1150° C. using 201.4 g. resublimed, anhydrous $FeCl_3$ (hence a $FeCl_3$:Ti molar ratio of 5.4, which is in excess of the 4:1 molar ratio theoreticaly required using $FeCl_3$) that is vaporized and carried into the reaction chamber over a period of 120 minutes by means of an argon stream metered at approximately 450 cc./min., measured at room temperature. A gaseous product is collected by cooling and condensation. At the end of the run the argon stream is used to free the residual ore/carbon bed from gaseous chlorides.

The residual ore/carbon bed, weighing 45.9 g. is separated magnetically into two fractions. The magnetic fraction, weighing 24.2 g., is analyzed and found to contain 89.80% Fe, 1.13% $TiO_2$, and small amounts of $SiO_2$, MgO and $Al_2O_3$, the balance being mostly carbon. The nonmagnetic fraction, mainly unreacted carbon, is ignited at about 900° C. leaving a residue that weighs 0.30 g. and contains 23.75% Fe and 28.83% $TiO_2$. It is calculated from the total iron in the bed residue, magnetic and nonmagnetic, that 18.12 g. $TiO_2$ (representing 98% of all the titanium in the ore) has been successfully chlorinated in the process. A total of 21.80 g. Fe (99% of the Fe in the ore) is left as metallic iron. The recovery of $TiCl_4$ is not complete due to insufficient cooling of the exit gas, yet over 86% of the Ti in the ore is thereby accounted for, i.e., 22.2 cc. $TiCl_4$ is collected as an essentially per liquid.

Again, a highly effective selective chlorination of titanium has occured, in this case using $FeCl_3$ as the starting material.

EXAMPLE 4

The apparatus employed is of the type described in FIG. 3. The reactor is a 42 mm. inside diameter silica tube. An excess of solid particulate $FeCl_2$ is first placed in the lower section of the reactor. Then the upper section is provided with three successive layers as follows: a lower layer of 5.0 g. carbon (as used in Example 1), a middle layer composed of a blend of 50 g. Allard Lake ilmenite (analyzing 37% $TiO_2$, 44% total Fe, and containing minor amounts of MgO, $Al_2O_3$ and $SiO_2$ and ground to −325 mesh size) and 50 g. of the same carbon as before, and a top layer of 10 g. of coarse particle size carbon to assist in prevention of blowover from the reactor.

While an argon purge at a rate of approximately 110 cc. per minute, measured at room temperature, is passed through the $FeCl_2$ and ore/carbon beds, an initial reduction is carried out for about 2 hours. This is before the flow of $Cl_2$ is commenced. During this time the temperature of the upper reactor section is maintained at about 1150° C. while the $FeCl_2$ bed in the lower section is maintained at about 500° C.

After completion of the two hour reduction period, the argon purge through the beds is discontinued and a flow of $Cl_2$ is commenced in its place. In this way $FeCl_3$ is formed which passes up and into contact with the ore/carbon bed. (In separate tests it is shown that 95+% of the $Cl_2$ is converted under these circumstances to $FeCl_3$. Over a period of 70 minutes, 34.7 g. of $Cl_2$ is fed in this manner. (The stoichiometric amount of $Cl_2$ theoretically required to react with the titanium constituent of the ore is 32.8 g.) During the chlorination period, argon is passed through the upper part of the reactor at the rate of about 200 cc. per minute, measured at room temperature, to aid in preventing pluggage of passages by $FeCl_2$. As a product, essentially pure $TiCl_4$ is collected by means of an ice bath condenser arrangement.

After completion of the reaction, the reactor is cooled, the bed residue is subjected to a magnetic separation, and the nonmagnetic fraction is ignited in air at about 900° C. to remove carbon. The total quantity of iron in the combined magnetic and nonmagnetic fractions is 21.7 g., which corresponds to about 98% of the total iron in the ore. Less than 2% of the iron has therefore been lost, i.e., by chlorination or as blowover. The combined fractions also contain less than about 0.1 g. titanium or less than 1% of the titanium in the ore. About 99% of the Ti in the ore has therefore been chlorinated. During the process 21.5 cc. $TiCl_4$ are collected. This amount represents 84% of the titanium content of the ore.

It is apparent that a highly efficient selective chlorination of the titanium content has taken place.

a period of 1 hour, thus utilizing a stoichiometric amount (based upon the titanium in the ore) of about 28.1 g. $Cl_2$. (In separate tests it is shown that 95+% of the $Cl_2$ is converted under these circumstances to $FeCl_3$.) A condenser and an auxiliary condenser are used as shown in FIG. 3 to collect essentially pure $TiCl_4$.

After the passage of $Cl_2$ into the reactor for one hour, its flow is discontinued, and a flow of argon is resumed for one hour. Then the reactor is allowed to cool and the bed residue removed and analyzed.

The results of the analyses are given in Table I. On the basis of the original iron and titanium contents of the ore and the relative proportions of each in the bed residue, calculations are made of the proportions of each which have been chlorinated. It is apparent that in the case of Examples 5–9 a highly selective chlorination of the titanium content has taken place. In the case of the Control using $Cl_2$ as the chlorinating agent and less than a stoichiometric amount of carbon relative to the oxygen in the ore, it is seen that virtually all of the iron and only about half of the titanium is chlorinated, in spite of the higher temperature.

TABLE I

| Example | Ore (Mesh Size) | Carbon Type | Mesh Size | % Stoichiometric* | of Fe and Ti in Chlorinating Agent | Temp. °C. | Relative Proportions % Fe and Ti in the Bed Residue Fe | Ti | Ore Chlorinated Fe*** | Ti |
|---|---|---|---|---|---|---|---|---|---|---|
| 5 | −325 | As in Ex. 1 | <400 | 120 | $FeCl_3$ | 1150 | 94 | 6 | 0 | 91 |
| 6 | −325 | Petroleum Coke | 80/120 | 400 | $FeCl_3$ | 1150 | 98 | 2 | 0 | 97 |
| 7 | −325 | Coal-based Coke | 80/120 | 400 | $FeCl_3$ | 1150 | 96 | 4 | 0 | 91 |
| 8 | −325 | Petroleum Coke | 80/120 | 200 | $FeCl_3$ | 1150 | 92 | 8 | 0 | 82 |
| 9 | 80/120 | Petroleum Coke | 80/120 | 400 | $FeCl_3$ | 1150 | 86 | 14 | 0 | 83 |
| Control | −325 | As in Ex. 1 | <400 | 58 | $Cl_2$** | 1300 | 2 | 98 | 99 | 49 |

*Based on oxygen in ore.
**$FeCl_2$ is omitted, the quantity of $Cl_2$ is the same at 28.1 g.
***For Examples 5–9 the bed residues actually show a net gain of iron from the chlorinating agent because the reactions are stopped before completion.

EXAMPLES 5–9

The apparatus is of the type shown in FIG. 3 and substantially the same as employed in Example 4. The reactor is a 42 mm. inside diameter silica tube. An excess of solid particulate $FeCl_2$ (except in the case of the Control) is placed in the lower section of the reactor while in the upper section is placed a mixture of 25.0 g. Florida ilmenite (analyzing 64% $TiO_2$, 24% total Fe, and containing minor amounts of $SiO_2$ and other oxides) and carbon of the type and quantity shown in Table I. The ilmenite is ground to the mesh size indicated in Table I.

While an argon purge at a rate of approximately 100 cc. per minute, measured at room temperature, is passed into the base of the reactor an initial reduction is carried out. This is continued for about two hours before the flow of $Cl_2$ is commenced. During this time the temperature of the section enclosing the ore/carbon mixture is maintained at about 1150° C. (1300° C. in the case of the Control) while the $FeCl_2$ bed is maintained at about 500° C.

After completion of the reduction, the argon purge is discontinued and a flow of $Cl_2$ is commenced through the $FeCl_2$ bed. In this way $FeCl_3$ is formed which passes into contact with the ore/carbon bed. In each instance the $Cl_2$ flow rate is 0.47 g./min. and this is continued for

EXAMPLES 10–13

The chlorination is practiced in these examples using a combination of $FeCl_2/HCl$ or $FeCl_2/HCl/Cl_2$. In each case there is employed an ore/carbon blend composed of 25.0 g. of Florida ilmenite (unground and analyzing 65% $TiO_2$, 22% total Fe, and containing minor amounts of $SiO_2$ and other oxides) and 26.3 g. petroleum coke (400% stoichiometric, 80/120 mesh size).

The apparatus employed is that described in connection with FIGS. 3 and 3a. The outside diameter of the silica tube is 30 mm. in the region where the ore/carbon blend is supported. The iron spheres are about 3 mm. in diameter and are composed of chrome alloy steel.

In each case the charge of ore/carbon blend is first prereduced while maintaining an argon purge through the reactor of approximately 200 cc. per minute, measured at room temperature. This is continued for about 2 hours before the flow of $Cl_2$ and HCl is commenced. During the prereduction and subsequent chlorination, the lower section of the furnace is maintained at 1150° C. while the upper section of the furnace is maintained at 110° C.

After completion of the reduction of the flow of the argon purge is discontinued. Then a flow of $Cl_2$ is commenced through the bed of iron particles and a flow of HCl or a mixture of $Cl_2/HCl$, as indicated in Table II, is commenced through the outer tube, the flow rates of each being selected to complete the addition of chlorinating agent in about one hour. (In separate tests it is shown that 95+% of the $Cl_2$ passing through the bed of iron particles is converted under these circumstances to $FeCl_2$.) The collection of $TiCl_4$ product is effected by condensation as before.

After completing the flow through the reactor of the amount of chlorinating agent indicated in Table II, a flow of argon is resumed for 1 hour. Then the reactor is allowed to cool and the bed residue removed and analyzed.

The results of the analyses are also given in Table II. On the basis of the original iron and titanium contents of the ore and the relative proportions of each in the bed residue, calculations are made of the proportions of each which have been chlorinated. It is apparent that in the case of Examples 10–13 a highly selective chlorination of the titanium content has taken place.

TABLE II

| Example | Chlorinating agent, moles per titanium atom in the ore | | | % Fe and Ti in Ore chlorinated | |
|---|---|---|---|---|---|
| | Mole HCl | Mole $Cl_2$ | Mole $FeCl_2$ | Fe* | Ti |
| 10 | 6.47 | 0 | 3.17 | 0 | 100 |
| 11 | 6.47 | 0 | 2.76 | 9 | 93 |
| 12 | 7.45 | 0 | 8.18 | 0 | 98 |
| 13 | 2.70 | 1.35 | 4.20 | 6 | 89 |

*The bed residues in Examples 10 and 12 actually show a net gain of iron from the chlorinating agent because the reactions are stopped before completion.

EXAMPLE 14

A high temperature chlorination is practiced in this example using a combination of $FeCl_2$ and $Cl_2$. The apparatus as well as the quantities and composition of the ore/carbon blend are the same as in Examples 10–13.

The charge of ore/carbon blend is again first prereduced for about 2 hours while maintaining an argon purge through the reactor of approximately 200 cc. per minute, measured at room temperature. During the prereduction and subsequent chlorination the lower section of the furnace is maintained at 1285° C. while the upper section of the furnace is maintained at 1100° C.

After completion of the reduction the argon purge is discontinued. A flow of $Cl_2$ is commenced through the bed of iron particles and a separate flow of $Cl_2$ is commenced through the outer tube, the flow rates of each being selected to complete the addition of chlorinating agent in about one hour. The chlorinating agent, in total, is composed of 1.88 moles $Cl_2$ and 1.50 moles $FeCl_2$. The collection of $TiCl_4$ product is effected by condensation as before.

After completing the flow of chlorinating agent through the reactor, the flow of argon is resumed for one hour. Then the reactor is allowed to cool and the bed residue removed and analyzed.

On the basis of the original iron and titanium contents of the ore and the relative proportions of each in the bed residue, calculations are made of the proportions of each which have been chlorinated. Thus it is found that 91% of the titanium in the ore has been chlorinated and that only 7% of the original iron content of the ore has been chlorinated. Again, a highly effective selective chlorination has taken place.

EXAMPLE 15

The procedure is exactly the same as given in Example 14 except that the chlorinating agent is composed of 0.612 moles $Cl_2$ and 2.92 moles $FeCl_2$, which is equivalent to 1.70 moles $FeCl_2$ plus 1.22 moles $FeCl_3$. These conditions are selected so as to deliberately leave in the bed residue following chlorination an amount of iron in excess of the iron in the ore itself.

In this case analyses of the bed residue show an amount of metallic iron which is equivalent to 337% of the original iron content of the ore. This represents, therefore, an effective means of consuming $FeCl_3$ in a way that it is recovered as metallic iron while the chlorine thereof is used to chlorinate titanium. In the course of the process, 91% of the titanium in the ore is actually chlorinated.

What is claimed is:

1. Process for chlorinating the titanium constituent of a titaniferous material without an appreciable net yield of iron chloride from the iron constituent of said material, whereby said iron constituent is recoverable in the metallic state, by intimately contacting said material with a chlorinating agent at an elevated temperature of 950° to 1400° C. and in the presence of a carbonaceous reductant, said chlorinating agent consisting essentially of $FeCl_2$ and $Cl_2$, all or part of said chlorinating agent may be in the form of $FeCl_3$, when the chlorinating agent consists essentially of $FeCl_2$ and other chlorine-containing members the ratio in the chlorinating agent of the atoms of chlorine provided by the total of said other chlorine-containing members to $FeCl_2$ being no more than about 4, and the atomic ratio of carbon in said carbonaceous reductant to oxygen in said material being at least about 1, whereby said ratio is at least stoichiometric to produce carbon monoxide.

2. Process according to claim 1 wherein the titaniferous material contains in excess of about 10% by weight each of titanium and of iron.

3. Process according to claim 1 wherein the titaniferous material is an oxidic ore containing about 20 to 50% by weight titanium.

4. Process according to claim 1 wherein the carbonaceous material is carbon.

5. Process according to claim 1 wherein the reaction is carried out to chlorinate at least about 75% by weight of the titanium content of the titaniferous material.

6. Process according to claim 1 wherein the reaction is carried out to convert at least 85% by weight of the iron in the titaniferous material to metallic iron.

7. Process according to claim 1 wherein the chlorinating agent is $FeCl_3$.

8. Process according to claim 1 wherein the chlorinating agent is a mixture of $FeCl_2$ and $Cl_2$.

9. Process according to claim 1 wherein the atomic ratio of total chlorine in the chlorinating agent to titanium in the titaniferous material is at least about 4.

10. Process according to claim 1 wherein the titaniferous material has been prereduced prior to contact with the chlorinating agent.

11. Process according to claim 1 wherein the chlorinating agent is a mixture of $FeCl_2$ and $Cl_2$ and the temperature is in the range of about 1000° to 1300° C.

12. Process according to claim 1 wherein the chlorinating agent is a mixture of $FeCL_2$ and $Cl_2$ in the molar ratio of 0.75:1 to 2:1 and the temperature is in the range of about 1000° to 1300° C.

13. Process according to claim 1 wherein the chlorinating agent is a mixture of $FeCl_2$ and $FeCl_3$ and the reaction is carried out to produce an amount of metallic iron in excess of that in the titaniferous material.

* * * * *